(12) United States Patent
Lueck

(10) Patent No.: US 7,768,257 B2
(45) Date of Patent: Aug. 3, 2010

(54) SYSTEMS AND METHODS FOR DETERMINING THE POSITION OF AN ELECTRICAL SOLENOID

(75) Inventor: Keith Lueck, Fenton, MO (US)

(73) Assignee: Alcotek, Inc., St. Louis, MO (US)

( * ) Notice: Subject to any disclaimer, the term of this patent is extended or adjusted under 35 U.S.C. 154(b) by 320 days.

(21) Appl. No.: 12/123,267

(22) Filed: May 19, 2008

(65) Prior Publication Data
US 2008/0284418 A1 Nov. 20, 2008

Related U.S. Application Data

(60) Provisional application No. 60/938,628, filed on May 17, 2007.

(51) Int. Cl.
*G01B 7/14* (2006.01)
(52) U.S. Cl. .............................. 324/207.16; 324/207.26
(58) Field of Classification Search ................................
324/207.15–207.16, 207.24, 207.26, 256–259
See application file for complete search history.

(56) References Cited

U.S. PATENT DOCUMENTS

| | | | |
|---|---|---|---|
| 4,321,946 A | 3/1982 | Paulos et al. |
| 4,488,116 A | 12/1984 | Plesko |
| 5,028,870 A | 7/1991 | Reed |
| 5,268,646 A | 12/1993 | Doss |
| 5,424,637 A | 6/1995 | Oudyn et al. |
| 5,453,685 A | 9/1995 | Gould et al. |
| 5,583,434 A | 12/1996 | Moyers et al. |
| 5,627,444 A | 5/1997 | Fulks |
| 6,128,174 A | 10/2000 | Ritter et al. |
| 6,194,892 B1 | 2/2001 | Lin et al. |
| 6,269,784 B1 | 8/2001 | Newton |
| 6,300,733 B1 | 10/2001 | Bergstrom |
| 6,390,784 B1 | 5/2002 | Kawaguchi et al. |
| 6,433,688 B1 | 8/2002 | Bomya |
| 2001/0050555 A1 | 12/2001 | Hawkins et al. |
| 2004/0030242 A1 | 2/2004 | Weber |
| 2004/0196047 A1 | 10/2004 | Fanini et al. |
| 2005/0047711 A1 | 3/2005 | Ide et al. |
| 2006/0061442 A1 | 3/2006 | Brooks |

(Continued)

FOREIGN PATENT DOCUMENTS

FR 2568693 2/1986

(Continued)

OTHER PUBLICATIONS

Kim, J., and Lieu, D.K., "Designs for a New, Quick-Response, Latching Electromagnetic Valve," Electric Machines and Drives, IEEE International Conference, May 15-18, 2005, pp. 1773-1779.

(Continued)

*Primary Examiner*—Bot L LeDynh
(74) *Attorney, Agent, or Firm*—Lewis, Rice & Fingersh, L.C.

(57) ABSTRACT

Provided herein are systems and methods which use the solenoid itself to sense the position of the armature within the solenoid, and therefore to determine the position of the solenoid's armature, and or any related devices whose movement is dependent on the armature's movement. Specifically, a system in which the change in self-induction that occurs when the armature moves relative to the solenoid coil is used to detect the location of the armature.

18 Claims, 4 Drawing Sheets

U.S. PATENT DOCUMENTS

2006/0279290 A1    12/2006    Swenson et al.

OTHER PUBLICATIONS

Bitner, D.V., et al., "Linear position control using simple solenoids and an electromagnet," Society of Automotive Engineers Transactions, 1990, p. 376 (Abstract), vol. 99, No. Sect. 2, Elsevier Inc.

"Solenoid valve," Wikipedia.org, http://en.wikipedia.org/wiki/Solenoid_valve, printed on May 13, 3008, 3 pages.

"Solenoid," Wikipedia.org, http://en.wikipedia.org/wiki/Solenoid, printed on May 13, 3008, 4 pages.

"What is solenoid?," Whatis.com, http://searchcio-midmarket.techtarget.com/sDefinition/0,,sid183_gci214067,00.html, printed on May 13, 2008, 2 pages.

"Definition of solenoid," YourDictionary.com, http://yourdictionary.com/solenoid, printed on May 13, 2008, 2 pages.

International Search Report, International Patent Application No. PCT/US08/64140, mailed on Oct. 17, 2008, 10 pages.

SYSTEMS AND METHODS FOR DETERMINING THE POSITION OF AN ELECTRICAL SOLENOID

CROSS REFERENCE TO RELATED APPLICATIONS

This application claims benefit of U.S. Provisional Patent Application No. 60/938,628, filed May 17, 2007, the entire disclosure of which is incorporated herein by reference.

BACKGROUND OF THE INVENTION

1. Field of the Invention

The present invention generally relates to methods for determining the position of the armature of a solenoid. In particular, a method where the back-emf waveform generated by a current pulse applied to the solenoid coil is measured to determine the location of the armature.

2. Description of Related Art

A solenoid is a coil of insulated or enameled wire usually wound on a rod-shaped form, known as the armature, which produces a magnetic field when a current is passed through it. Solenoids are important because they can create controlled magnetic fields and can be used as electromagnets. The term solenoid is often used in reference to a magnet designed to produce a uniform magnetic field in a volume of space.

In a solenoid, the core material is usually ferromagnetic, meaning that it concentrates magnetic lines of flux. This increases the inductance of the coil far beyond the inductance obtainable with an air-core coil of the same dimensions and the same number of turns. When current flows in the coil, most of the resulting magnetic flux exists within the core material. Some flux appears outside the coil near the ends of the core; a small amount of flux also appears outside the coil and off to the side.

The inductance of a solenoid is the ratio of the magnetic flux to the current. This is more accurately referred to as the self-inductance of the circuit. The quantitative definition of inductance is $L=\Phi/i$. When a solenoid armature moves relative to the solenoid coil, a change in self-inductance occurs.

In the field of engineering, the term solenoid may refer to a variety of transducer devices that convert energy into linear motion. The term is also used to refer to a solenoid valve, which is an integrated device containing an electromechanical solenoid which actuates either a pneumatic or hydraulic valve, or a solenoid switch. A solenoid switch is a specific type of relay that internally uses an electromechanical solenoid to operate an electrical switch.

Solenoid valves are the most frequently used control elements in fluidics. Their tasks are to shut off, release, dose, distribute or mix fluids. Solenoids offer fast and safe switching, high reliability, long service life, good medium compatibility of the materials used, low control power and compact design Because of these properties, solenoid valves are found in many application areas. Examples of these include an automobile starter solenoid or a linear solenoid, which is an electromechanical solenoid. Electromechanical solenoids are commonly seen in electronic paintball markers, dot matrix printers and fuel injectors. Pneumatic solenoid valves are commonly used to control pistons or other linear actuators. Hydraulic solenoid valves are used to control the flow of oil to rams or actuators to bend sheers of titanium in aerospace manufacturing, irrigation systems and the flow of fluid through an automatic transmission. In addition, solenoids can be used to provide for locking mechanisms, electrical switching systems, and other related devices.

One common use for a solenoid is to provide for a sample selector. In this use the solenoid can serve to draw a small portion of a larger sample into a testing area, The movement of the plunger/armature serves to essentially pull a portion of the sample into the testing area by its movement either by physically moving the sample by the movement of the plunger/armature, or by directing a larger scale piece by such movement. Such a use can provide for smaller electromechanical sampling devices and can be useful in a number of industries. It should also be noted that besides the plunger-type actuator which is used is in the above described sample selector, and most frequently in electromechanical systems in general, pivoted-actuators and rocker actuators are also used.

Regardless of how a solenoid is used, it is often desirable or necessary to determine the position of a mechanism that is operated by a solenoid or the location of a solenoid plunger/armature itself and systems have been developed in the industry for this purpose. Typically these systems use some form of position feedback comprising a variety of sensors that can verify that the mechanism has achieved the desired mechanical state after the solenoid has been energized. Generally, these systems are external to the solenoid and may comprise mechanical, optical or electrical systems added to the solenoid which can effectively determine the location of the solenoid plunger/armature or something attached to it. For example, the armature may break a laser beam in one position and not in another, or movement of the armature may cause a lever to move between two different, mechanically detectable positions.

In another example, there are systems in which two solenoid coils are used, one as a transmitter and one as a receiver. These secondary coils generally do not contain a motive element and are used for sensing only. Other systems use complex micro processor-controlled schemes to determine the location of the armature.

These position feedback devices add complexity and cost to the design where it is desirable to know the position of the solenoid's armature, or the mechanism attached to it. Further, in some uses of the solenoid, these position-sensing systems may be impractical as they can inhibit or interfere with the operation of mechanisms attached to the solenoid and may become a hindrance to product design.

SUMMARY OF THE INVENTION

The following is a summary of the invention in order to provide a basic understanding of some of the aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems know to those of skill in the art, described herein, among other things, are systems and methods which use the solenoid itself to sense the position of the armature within the solenoid, and therefore to determine the position of the solenoid's armature, and or any related devices whose movement is dependent on the armature's movement.

Specifically, the systems integrate the back-emf waveform that is generated when a small current pulse is applied to the solenoid coil to utilize the current induction of the solenoid itself to locate the position of the armature.

There is described herein, among other things, a method for determining the position of an armature in a solenoid, the method comprising: providing a solenoid having an armature and a coil; applying a current pulse to said coil; obtaining a back-emf waveform from said solenoid; integrating said back-emf waveform; and determining a location of said armature from said integrated back-emf waveform.

In an embodiment of the method, said back-emf waveform is gated prior to said integrating.

In an embodiment of the method, the method may be used in a latched or non-latched solenoid drive scheme.

In another embodiment of the method, the method will be integrated into a drive mechanism for said solenoid.

In another embodiment of the method, said current pulse is a square pulse and may be insufficient to move said armature relative to said coil.

There is also described herein a solenoid and control circuit comprising: a coil; an armature within said coil; means for generating a current pulse in said coil; means for detecting a back-emf waveform generated by said coil in response to said pulse; means for integrating said back-emf waveform; and means for using said integrated back-emf waveform to determine the location of said armature relative to said coil.

In an embodiment of the circuit, the means for using is integrated into drive electronics for said solenoid, the means for generating generates a square wave pulse input, or the circuit includes means for gating said back-emf waveform.

There is also described herein, a system for determining the position of a solenoid, the system comprising: a solenoid including a coil and an armature within said coil; a current generator for generating a current in said coil; a processor for inducing said current generator to provide a current pulse in said coil and; an integration circuit integrating said back-emf waveform; and a processor for utilizing said integrated back-emf waveform to determine a location of said armature relative to said coil.

In an embodiment of the system, said current generator, said detector, and said processors are integrated into drive electronics for said solenoid.

In an embodiment of the system, said pulse processor induces a square wave pulse.

In another embodiment, the system further comprises, a gate circuit. The current generator, said detector, said gate circuit, and said processors may be integrated into drive electronics for said solenoid or the pulse generator, said detector, said integration circuit, and said gate circuit may be part of an integrated circuit.

In a still further embodiment of the system, the processor for inducing and said processor for utilizing are the same processor.

DETAILED DESCRIPTION OF THE PREFERRED EMBODIMENT(S)

The following detailed description illustrates by way of example and not by way of limitation Described herein, among other things, are systems and methods which use the solenoid itself to sense the position of the armature within the solenoid, and therefore to determine the position of the solenoid's armature, and or any related devices whose movement is dependent on the armature's movement. Such systems do not require the inclusion of any additional hardware (such as secondary solenoid coils, lasers, or similar devices) interacting with the solenoid to locate the solenoid's armature.

In an embodiment, there is provided a method for using the change in self-inductance that occurs when the armature moves relative to the solenoid coil to detect the location of the plunger/armature relative to the solenoid coil. Specifically, when an armature is fully within the coil, the inductance of the solenoid is detectably larger than when the armature is extended from the coil.

In many small solenoid systems, the change can be very small and detecting the change in inductance from the movement of the armature as little as a few hundredths of an inch can be exceedingly difficult. The problem can be further compounded as circuits attuned to detecting such small changes in inductance can also inadvertently detect electrical noise leading to inaccurate readings.

Figure 1:
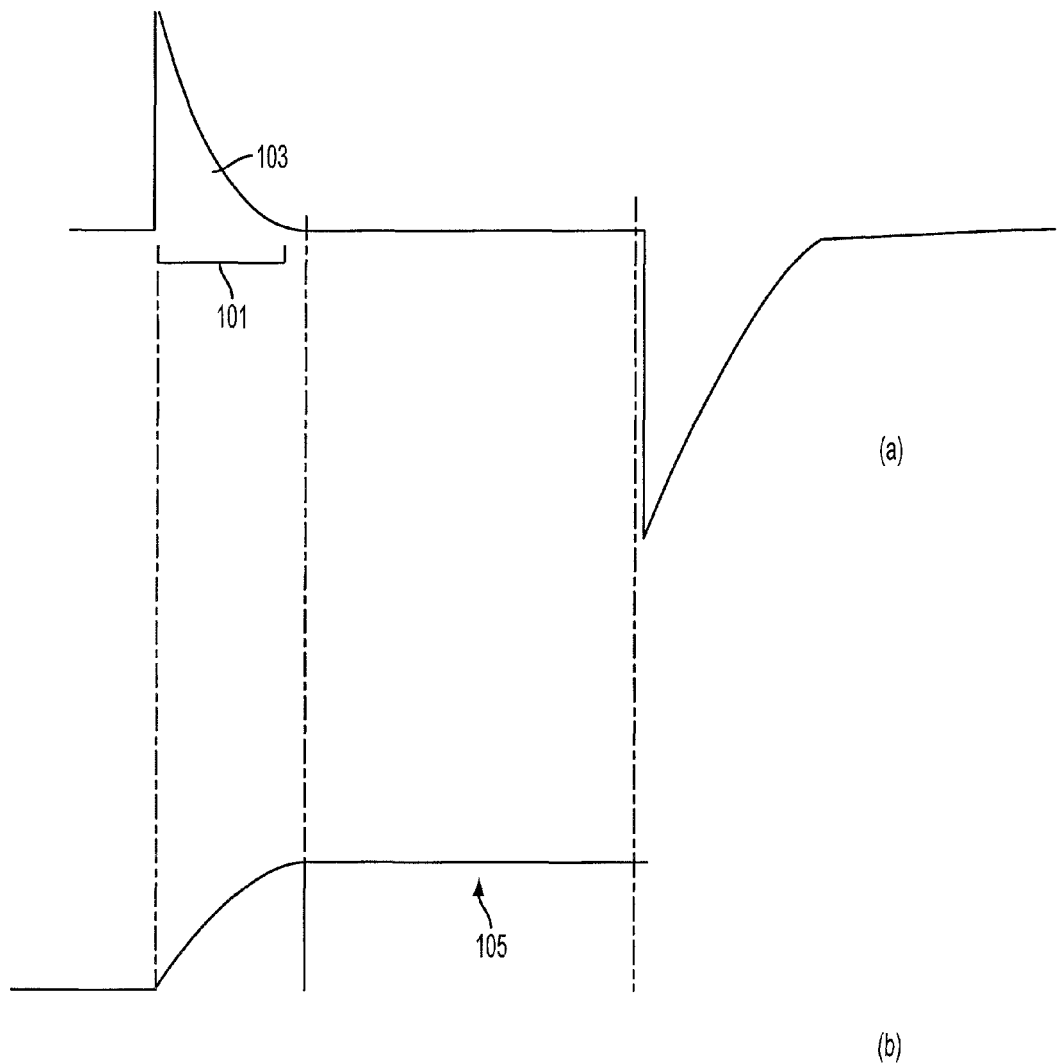
FIG. 1a provides for a graph indicating the back-emf waveform from passing a square-wave electrical pulse through a solenoid.
FIG. 1b shows the integrated value of the same back-emf waveform.

In order to assist in the detection in an embodiment, the method for determining the location of the armature utilizes a small (generally many times smaller than that required to operate the solenoid) current pulse applied to the solenoid coil, In response to the current pulse, the solenoid will generate an inductive "kick" or back-emf waveform which is detectable to various detection devices. One such back-emf waveform generated from a square wave pulse applied to a solenoid is shown in FIG. 1a This type of waveform is generally generated when a constant current on the solenoid coil is removed. Therefore a square pulse of current applied to the solenoid which allows the solenoid to obtain a constant current which is then removed, can serve to generate the back-emf waveform The generation of the current pulse depends both on the size and type of the solenoid, as well as the environment in which the solenoid is used. The current pulse may be generated in a variety of ways, in an embodiment, it is possible to use a simple voltage switch turning on and off in order to generate the fixed current pulse. In certain types of solenoids, however, for instance whose where the temperature of the solenoid may vary widely, it can be desirable to have a regulated constant current source which is used to generate the square wave.

The pulse can be generated from a variety of different mechanisms, however, it may be generated and/or controlled by a processor (such as a microprocessor) in an embodiment or generated by a hardware function which obtains current from a battery or other source of current. In many cases, this battery will be provided to power other functions of the device including the solenoid as well.

The exact size of the pulse will generally be selected based on the specifics of the solenoid design. Generally, the size will be the largest which can be used while still being insufficient to result in motion of the solenoid. This may determined experimentally or theoretically and may include a safety factor to inhibit accidental movement of the solenoid during the testing sequence. The larger pulse is preferred as it generally provides for a bigger back-emf wave which makes the back-emf waveform easier to segregate from background noise which may be present. However, in some applications the ability to segregate the back-emf waveform from noise is balanced against battery life or similar considerations. For these reasons, the specific current pulse used will generally be selected from a multitude of factors which allow for the back-emf waveform to be detected by the associated components of the system.

The time constant (101) of the back-emf waveform may be measured directly. As the time constant (101) is directly proportional to the inductance of the solenoid, the location of the armature may then be calculated in a known fashion from the inductance. However, Instead of attempting to measure the time constant (101) of the back-emf waveform, which while directly proportional to inductance is very small, the back-emf waveform may be integrated, in an embodiment, to amplify the small change in its shape due to the change in inductance. Such a method therefore produces a larger change in output as even small changes in inductance will generally produce a significantly larger change to an integrated value. An embodiment of the integrated value (103) for the back-emf waveform of FIG. 1a is shown in FIG. 1b. As this integrated value is proportional to the time constant (101), the inductance of the solenoid may again be computed from this value, and from the inductance, the location of the armature may be deduced.

This can be particularly valuable in solenoids which have fixed positions E.g. an open and a closed position. In such a situation, there is no need to specifically calculate the inductance, instead a simple logical operation may be performed with the inductance of one value indicating the solenoid switch is "open" while a different value indicates that it is "closed." Such operation also allows for relatively little error in calculation as values can be seen as being sufficiently close to a target to indicate the specific position, or an error can be returned if an unexpected value is obtained.

Due to concerns that the back-emf waveform may not return to zero, which could result in a steadily increasing value to the integrated value, in an embodiment of the method, gating may be performed on the integrated signal so that if the solenoid back-emf waveform returns to a non-zero value, meaning that section (105) is not actually level as shown in FIG. 1b, the continuously increasing value of the integration due to such an offset does not lead to a greater detected area than is actually present.

Integrating of the back-emf waveform has the additional benefit of being robust since short-duration interference which may be otherwise detected and interpreted as position data by the sensor designed to sense the back-emf waveform is likely to be filtered out by the inherent low-pass nature of integration. Furthermore, and even more importantly, the integration method is generally not affected by the addition of the "free-wheeling" or "back-emf protection" diodes typically found in solenoid drive circuits, The presence of such diodes makes simpler methods of directly measuring the solenoid's self-inductance much more difficult.

While the method may be performed by any circuit or mechanism designed to detect and integrate the back-emf waveform, it is possible that, in an embodiment, circuitry to detect the change in inductance could be integrated into the solenoid drive electronics, thus providing the solenoid drive and sensing functions in one circuit without needing to include separate components specific to the location function.

In its simplest form, the method, therefore, uses a single solenoid for both motive and sensing purposes. If a larger current is applied to the solenoid coil, the solenoid will be moved in the standard fashion. If detection of the location of the armature is desired, a smaller current will be applied to the solenoid, it will not result in a movement of the armature but will serve to detect the location of the armature. Upon application of the smaller current, the solenoid will generate an inductive "kick" or back-emf waveform. This "kick" or back-emf waveform is proportional to the solenoid's current induction, which is dependent on the location of the armature within the solenoid. This signal is integrated by a straightforward analysis and measured. The value of the integrated signal can then be used to determine the induction of the solenoid, or simply referenced against known values to indicate the location of the armature relative to the solenoid coil. Thus, the same solenoid coil will be used for both motion (moving the armature) and sensing (detecting the position of the armature) allowing for detection without the inclusion of additional sensing hardware.

Figure 2:
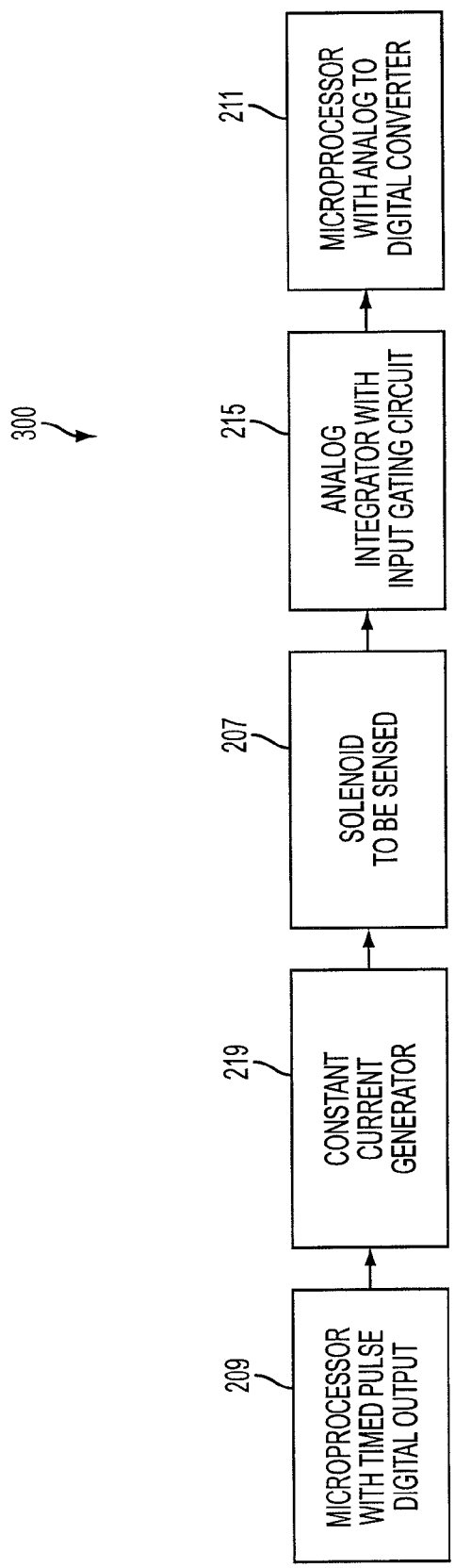
FIG. 2 is block diagram illustrating an embodiment of a system capable of determining the integrated back-emf waveform from a solenoid to determine it position.
Figure 3:
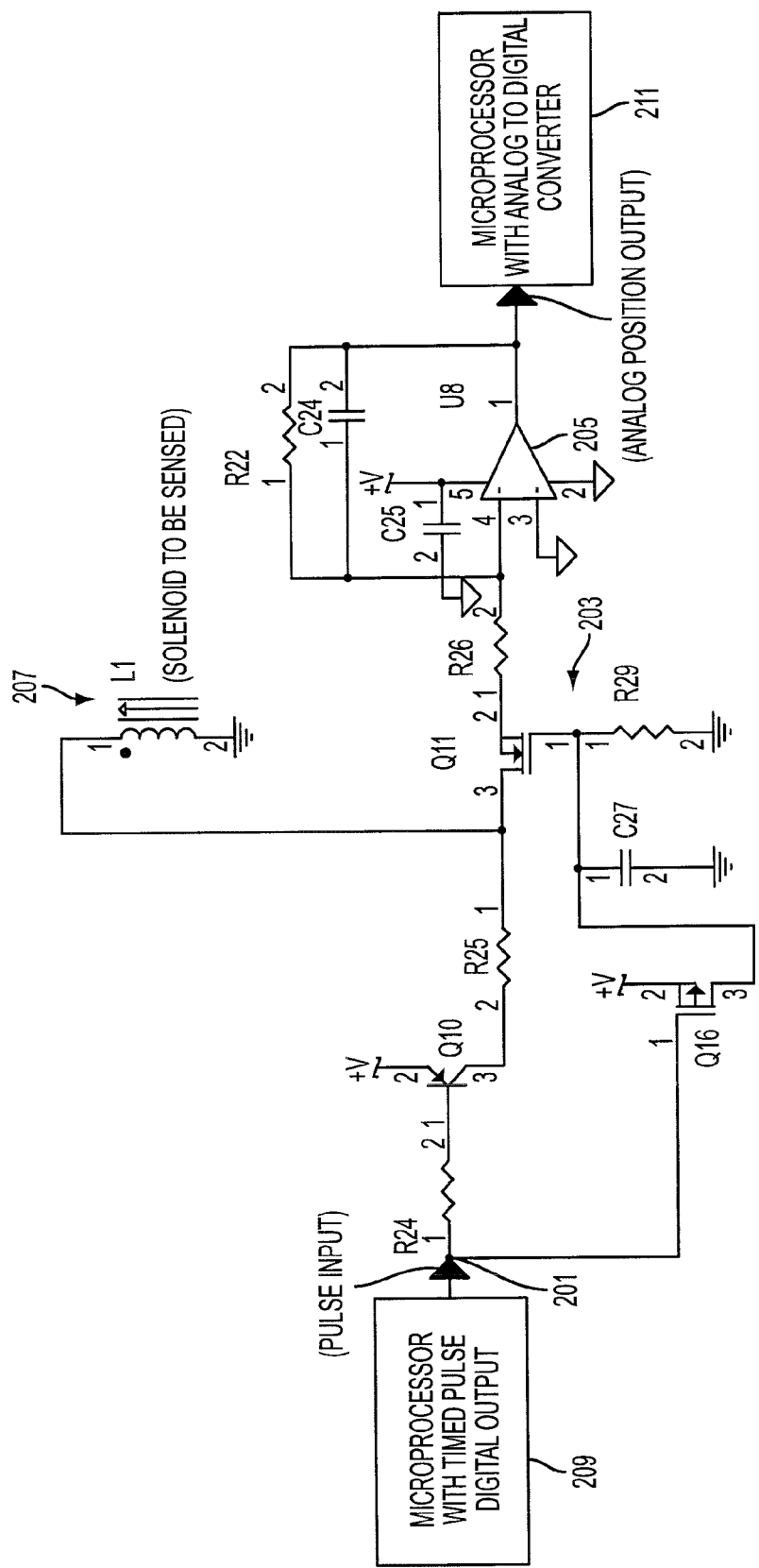
FIG. 3 is a circuit diagram illustrating an embodiment of a circuit capable of determining the integrated back-emf waveform from a solenoid to determine its position.

FIG. 2 provides for a block diagram of a system (300) for integrating the back-emf waveform and locating a position of a solenoid (207). FIG. 2 provides for an embodiment of a circuit (200) capable of performing the detection of the back-emf signal and integration of the waveform measuring the integrated value of the back-emf waveform from a solenoid (207). A square wave pulse input is generally indicated by a microprocessor (209) or similar device acting on a constant current generator (219). The pulse is sent into the circuit (200) at input (201) by any manner known to one of ordinary skill in the art and the microprocessor and current generator is simply one example. In another embodiment, the pulse may be generated from circuitry associated with operation of the solenoid (207) simply being instructed to produce the small square wave pulse instead of the standard motive signal. Alternatively, dedicated circuitry for creating a square wave pulse may be used. This back-emf waveform will be detected by the circuit (200), either through a dedicated detection circuit or simply through circuits designed to perform other functions such as the gate (203) circuit or integration (205) circuit. Alternatively, the gate and integration may be combined in s a single component (215). The circuit (200) may include a gate (203) circuit to provide for the gating function as discussed above and will also include an integration (205) circuit to perform the integration functions as discussed above. Both these functions being performed on the back-emf waveform generated by the solenoid (207) in response to the square wave pulse being applied.

The integrated output may then be interpreted either directly by the integrator (205) or by a processor (211) or other device, to provide the position of the armature indicated by the value of the integrated waveform. A meter or similar device could also be used to display the output. Alternatively, the output could simply be provided as a logical answer using an analog to digital converter or similar device which would indicate that an integrated value above a predetermined amount was in a first state, while a value below that amount was in the second state. As the integrated valve will be related to the back-emf waveform time constant (101) as well as the inductance of the solenoid in a known fashion, the value can be used to determine the location in a straightforward fashion. In particular, the inductance may be used to determine the position, or the integrated value may be used directly without need to actually determine the inductance.

Figure 4:
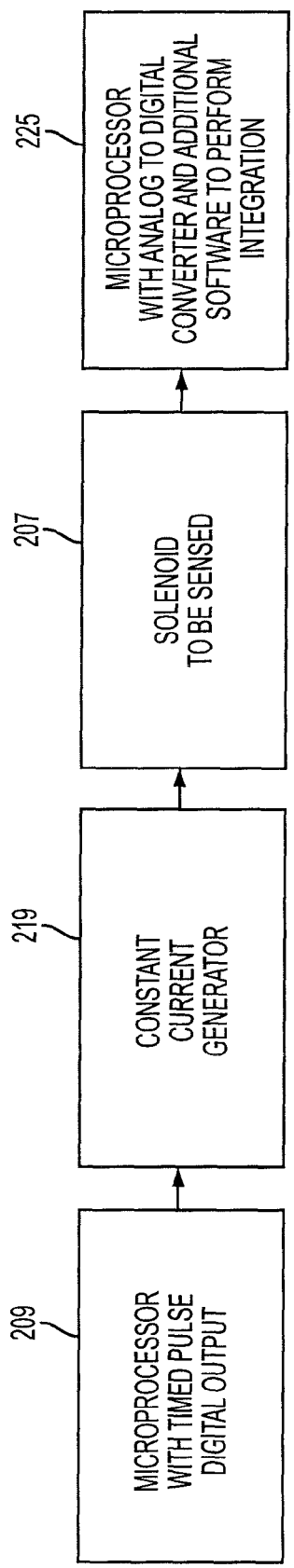
FIG. 4 is block diagram illustrating another embodiment of a system capable of determining the integrated back-emf waveform from a solenoid to determine its position.

In another embodiment, as shown in FIG. 4, the processor (211) which determines the location may also run a software integration function allowing for elimination of the hardware integrator (205). In such an embodiment, the processor (225) may provide integration function as well as other functions.

In a still further embodiment, the two processors (211) and (209) or (225) and (209) may have their functions combined and be the same processor performing both input and analysis functions.

The systems and methods discussed above may be used in a latched solenoid drive scheme or "on the fly" in a non-latched solenoid drive scheme. Alternatively, the system and method may be integrated into a drive mechanism or chip for the solenoid.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. A method for determining the position of an armature in a solenoid, the method comprising:
   providing a solenoid having an armature and a coil;
   applying a current pulse to said coil;
   obtaining a back-emf waveform from said solenoid;
   integrating said back-emf waveform; and
   determining a location of said armature from said integrated back-emf waveform.

2. The method of claim 1 further comprising:
   gating said back-emf waveform prior to said integrating.

3. The method of claim 1 wherein said method will be used in a latched solenoid drive scheme.

4. The method of claim 1 wherein said method will be used in a non-latched solenoid drive scheme.

5. The method of claim 1 wherein said method will be integrated into a drive mechanism for said solenoid.

6. The method of claim 1 wherein said current pulse is a square pulse.

7. The method of claim 1 wherein said current pulse is insufficient to move said armature relative to said coil.

8. A solenoid and control circuit comprising:
   a coil;
   an armature within said coil;
   means for generating a current pulse in said coil;
   means for detecting a back-emf waveform generated by said coil in response to said pulse;
   means for integrating said back-emf waveform; and
   means for using said integrated back-emf waveform to determine the location of said armature relative to said coil.

9. The circuit of claim 8 wherein means for using is integrated into drive electronics for said solenoid.

10. The circuit of claim 8 wherein said means for generating generates a square wave pulse input.

11. The circuit of claim 8 wherein circuit includes means for gating said back-emf waveform.

12. A system for determining the position of a solenoid, the system comprising:
    a solenoid including a coil and an armature within said coil;
    a current generator for generating a current in said coil;
    a processor for inducing said current generator to provide a current pulse in said coil and;
    an integration circuit integrating said back-emf waveform; and
    a processor for utilizing said integrated back-emf waveform to determine a location of said armature relative to said coil.

13. The system of claim 12 wherein said current generator, said detector, and said processors are integrated into drive electronics for said solenoid.

14. The system of claim 12 wherein said pulse processor induces a square wave pulse.

15. The system of claim 12 further comprising, a gate circuit.

16. The system of claim 15 wherein said current generator, said detector, said gate circuit, and said processors are integrated into drive electronics for said solenoid.

17. The system of claim 15 wherein said pulse generator, said detector, said integration circuit, and said gate circuit are part of an integrated circuit.

18. The system of claim 12 wherein said processor for inducing and said processor for utilizing are the same processor.

* * * * *